United States Patent
Morejon et al.

(10) Patent No.: US 7,377,657 B2
(45) Date of Patent: May 27, 2008

(54) IMAGE PRESENTATION DEVICE WITH LIGHT SOURCE CONTROLLER

(75) Inventors: Israel J. Morejon, Tampa, FL (US); Robert J. Pantalone, Clearwater, FL (US); Chandrika Sugrim, Riverview, FL (US); Patrick J. Verdon, Palm Harbor, FL (US); Toon Diels, Balen (BE)

(73) Assignee: Jabil Circuit, Inc., St. Petersburg, FL (US)

( * ) Notice: Subject to any disclaimer, the term of this patent is extended or adjusted under 35 U.S.C. 154(b) by 18 days.

(21) Appl. No.: 11/142,132

(22) Filed: Jun. 1, 2005

(65) Prior Publication Data

US 2006/0274286 A1   Dec. 7, 2006

(51) Int. Cl.
*H04N 5/70* (2006.01)
*G03B 21/20* (2006.01)

(52) U.S. Cl. .................. 353/85; 353/121; 348/801; 349/69

(58) Field of Classification Search ............. 353/21, 353/28, 29, 34, 69, 85, 94, 121, 122; 348/800–803, 348/745, 771; 349/61, 62, 69
See application file for complete search history.

(56) References Cited

U.S. PATENT DOCUMENTS

| | | | |
|---|---|---|---|
| 6,630,801 B2 * | 10/2003 | Schuurmans | 315/307 |
| 6,707,596 B2 * | 3/2004 | Tomiya | 359/291 |
| 7,030,574 B2 * | 4/2006 | Lim et al. | 315/312 |
| 7,066,606 B2 * | 6/2006 | Greve et al. | 353/85 |
| 2003/0122972 A1 * | 7/2003 | Nelson et al. | 348/745 |
| 2006/0066540 A1 * | 3/2006 | Hewlett et al. | 345/84 |

\* cited by examiner

*Primary Examiner*—Andrew T. Sever
(74) *Attorney, Agent, or Firm*—Price Heneveld Cooper Dewitt & Litton LLP

(57) ABSTRACT

An image presentation device (100) includes a set of color light sources (122, 124, 126) and a micro-display panel (150) capable of operating in both image processing and non-image processing modes. A sensor (170) is coupled to the micro-display device (150) to convert light received from the light source (122, 124, 126) into a signal value representing the output from the light source (122, 124, 126). A controller (110), responsive to the signal value, selectively and/or collectively varies the input to each of the individual light sources (122, 124, 125) to provide for consistent operating performance over the life of the product.

10 Claims, 2 Drawing Sheets

IMAGE PRESENTATION DEVICE WITH LIGHT SOURCE CONTROLLER

FIELD OF INVENTION

This invention relates to image processing, and more particularly to image processing using micro-display devices.

BACKGROUND

Video projection systems that use micro-display panels, such as digital mirror devices (DMD), are well known in the art. A desirable feature of such systems is to provide for good color accuracy and brightness consistently over the life of the product. However, as such systems are used over time, poor performance may occur due to degradation in light source performance. Various correction systems have been proposed with respect to traditional video projection systems. One such approach is described in U.S. Pat. No. 6,707,596, issued to Shu Tomiya on Mar. 16, 2004, and entitled "Digital Mirror Device Projector and Method of Controlling Amount of Light Being Used in Digital Mirror Device Projector," which is hereby incorporated by reference in its entirety. According to the patent disclosure, the inventor purports to control a lamp source output by manipulating a DMD to direct light from the lamp source to a photo-sensor, by comparing the output from the photo-sensor to a reference voltage, and by adjusting the input voltage to the lamp source to maintain constant output such that the output voltage at the photo-sensor matches the reference voltage. Tomiya's system uses a single lamp source, employing color wheel filtration that can be difficult to finely control. In addition, the proposed control system may prove ineffective when multiple light sources are introduced. It is therefore desirable to have a video projection or image presentation device that avoids the necessity and complexity of prior art systems employing color wheel and/or color filtration systems, while assuring consistent color performance and accuracy over the life of the product.

DETAILED DESCRIPTION OF THE PREFERRED EMBODIMENT

The present invention provides for an image processing system that utilizes feedback representing light source output, to manipulate, modify, or adjust input values to one or more of a set of differing color light sources, to provide for image output control for a micro-display panel based presentation device. Preferably, the intensity of each of a set of red, green, and blue light sources is individually controlled based at least in part on input from a light or color sensor to vary the overall illumination of the micro-display panel.

Figure 1:
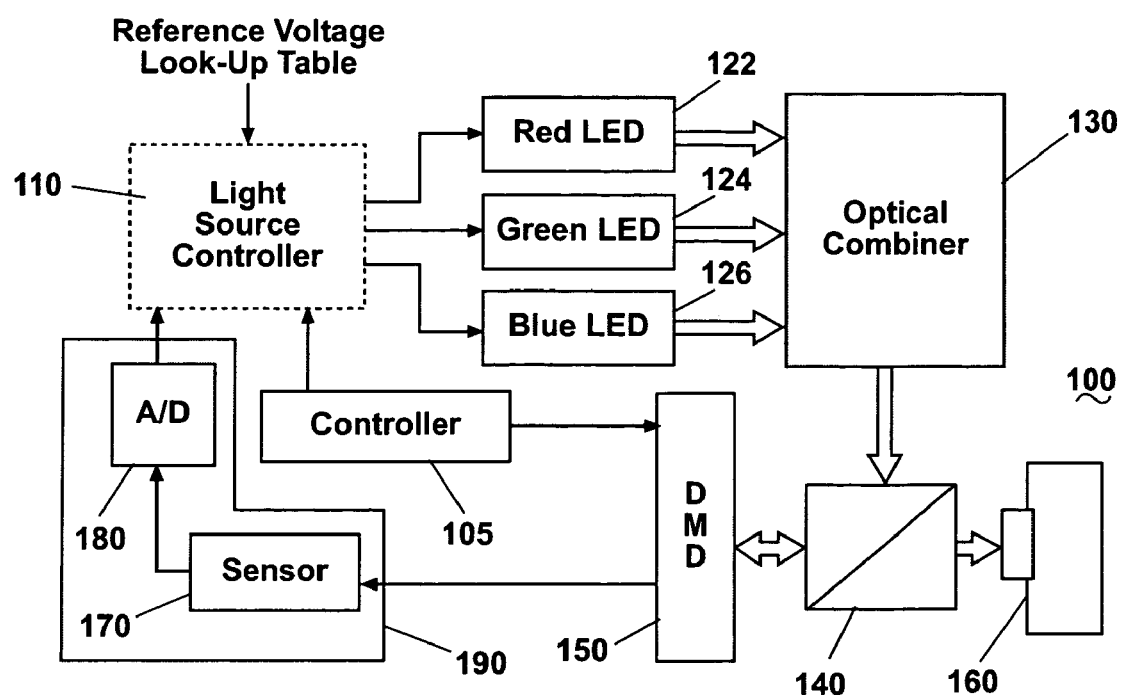
FIG. 1 shows an image presentation device with a DMD panel in accordance with the present invention.

FIG. 1 shows a digital micro-mirror device (DMD) based image presentation device 100, in accordance with the present invention. Only elements necessary for the understanding of the invention are shown since DMD based image projection systems are well known in the art. The image presentation device 100 of the present embodiment is a rear projection television system, but can easily be a front projector or other micro-display based system. The device 100 utilizes red, green, and blue light emitting diodes (LEDs) 122, 124, 126 as light sources. A primary advantage associated with the light source selection of the present invention is reduced cost and complexity when compared to prior art systems that employ color wheels and various light filtration systems that are typically required to generate basic colors within the color spectrum.

Light sources 122, 124, 126 are individually controlled to output light to an optical combiner 130. The optical combiner is preferably formed from a combination of collimation lenses, condenser lenses, and dichroic prisms that together form part of a light engine for a DMD based system. Various configurations of light engines that may be used with the present invention are known in the art and will not therefore be described or discussed in further detail. The optical combiner is coupled to a prism 140 which redirects light output from the optical combiner 130 to a DMD panel device 150. The DMD panel device 150 comprises a large number of microscopic mirrors that, in conjunction with a first or image processing mode of operation, selectively reflect light through the prism 140 and onto projection optics 160 for display on a screen (not shown) for operator viewing. The DMD panel device 150 and light source controller 10 operate under the control of a controller 105 that manages both the image processing and non-image processing modes of operation of the device 100. Controller 105 is preferably a digital light processor (DLP) application specific integrated circuit (ASIC) which has, in the past, been commercially available from Texas Instruments Corporation.

As shown, the DMD panel device 150 is also coupled to sensor 170. In conjunction with a second or non-image processing mode of operation, light being incident through the prism 140, but not being projected onto projection optics 160 is input to the sensor 170. In response, sensor 170 outputs a signal representing the output from the light emitting diodes 122, 124, 126. The sensor output is converted by analog-to-digital (A/D) converter 180 to a digital control signal and then fed to light source controller 110 for purposes of adjusting individual and/or collective light source inputs to LEDs 122, 124, 126. As will be appreciated by those skilled in the art light source controller 110 may advantageously employ various digital logic circuitry and/or memory devices of a type well known in the art for the purpose of interfacing with and utilizing the information derived from the digital control signal from A/D converter 180.

In accordance with the present invention, sensor 170 is selected from the group of photo-sensors and photo-detection devices capable of outputting an electric signal that corresponds to various characteristics of light energy as generated by light source 122, 124, 126. Characteristics of interest include, but are not limited to: light intensity, color accuracy, and color clarity. In accordance with the preferred embodiment, sensor 170 will employ a light intensity sensor, a photoelectric conversion device, a PIN diode, or any other such device capable of converting light energy into electric impulse for purpose of measurement and/or detection. In further accordance with the preferred embodiment, sensor 170 and A/D converter 180 may be combined into a single device commonly referred to as a light-to-digital (L/D) converter 190. Such devices convert light energy into a digital signal output capable of direct interface to digital logic circuits, such as, for example, general purpose microprocessors and micro-controllers, or application specific logic control circuits.

In accordance with the present invention, the digital signal output from L/D converter 190 is input to the digital logic circuitry of light source controller 110, whereby luminance (i.e., light intensity) as measured in values of lux is derived using well known empirical formulas that approximate the human eye response. Light-to-digital converters of the type discussed herein have, in the past, been commercially available by contacting Texas Advanced Optoelectronics Solutions Inc. at its offices located at 800 Juniper Road, Suite 205, Plano, Tex. 75074.

As will be appreciated by those skilled in the art, over the life of a projection television system of the type anticipated by the present embodiment, variances in light source operating characteristics may have deleterious affect on the quality and the clarity of images produced by the image presentation device 100. By way of example, should, the operating characteristics of the individual LEDs 122, 124, 126, start to change or deteriorate over time, the color clarity, color accuracy, and picture quality of the images produced by image presentation device 100 will start to decline. It is therefore an advantage of present invention to controllably manipulate, modify, and/or adjust inputs to the individual light sources for purposes of maintaining a particular white light performance characteristic despite component aging or other conditions giving rise to variances in light source operation.

As is known, color space theory is quite complex and a full discussion thereof is beyond the scope of this disclosure. Notwithstanding, in the computer graphics art, a device's color space is defined by its color gamut, white point, and tonal reproduction curve. A color gamut specifies the full range of colors that an input or output device (e.g., digital camera, printer, monitor, television, etc.) is capable of detecting and/or displaying. Of note, colors outside a devices color gamut cannot be detected, displayed, or reproduced. The device white point is the area inside the color gamut that corresponds to the device's rendition of pure white. In other words, the white point may be defined as the temperature in degrees Kelvin (K) color temperature to which a display is calibrated for the purpose of presenting a white color. For purposes of digital imaging, the International Organization for Standardization (ISO) suggests a white point setting of 6500 K. While higher values may be used, it will be appreciated by those skilled in the art that a higher white point setting, such as, for example, 9300 K, will have a decidedly blue hue, but will nevertheless offer higher brightness than the white point setting of 6500 K. Finally, the device tonal reproduction curve is a mathematical formula used to convert a linear representation of color intensities into something more curved. As will be appreciated by those skilled in the art, this curvature is required because of the way the human eye perceives changes in both light color and intensity.

When all three variables (i.e., color gamut, white point, and tonal reproduction curve) for a particular device are known, then the color space for that device is defined. Based upon this definition, should device performance start to deviate from the norm, then the present invention can be utilized to recalibrate the device's color space. By way of example, if, over time, the white point for a particular device exhibits a shift from 6500 K to a setting of 9300 K, the present invention can be employed to recalibrate the device white point back to its proper setting of 6500 K. As will be appreciated after review hereof, this may be accomplished in a number of advantageous ways in accordance with the present invention. It is therefore, a further advantage of the present invention to controllably manipulate, modify, and/or adjust inputs to the individual light sources for purposes of maintaining consistent performance, both electrical and visual, over the life of the product.

In accordance with the preferred embodiment, the detection of light output is most advantageously performed during the non-image processing mode of operation of device 100. One such point in time is during system power-up and initialization. Under direction from controller 105, light source controller 110 will apply a predetermined electrical input signal to light sources 122, 124, 126. Depending on the desired test, such inputs can be presented to the LEDs individually, collectively, or in various combinations. Resultant light incident through the prism 140, is not projected onto projection optics 160, but is instead directed to sensor 170. In response, sensor 170 outputs a signal having a value representing the output from the light emitting diodes 122,124,126. The sensor 170 output value is then converted by Analog to Digital (A/D) converter 180 to a digital control signal that is fed to light source controller 110. Once again, depending on the system performance parameters under evaluation, the digital control signal can be used for purposes of adjusting individual and/or collective light source inputs to LEDs 122, 124, 126.

By way of example, and not by way of limitation, each LED can be exercised individually and tested for a measure of light intensity. Resultant measures can be compared to previously detected or referenced values as stored in a light source controller 110 memory device (not shown). If an individual LED exhibits degraded intensity performance, controller 110 can increase the input signal magnitude of the LED in question until the desired intensity level for the LED in question is detected by sensor 170. As will be appreciated by those skilled in the art, each LED 122,124,126 of the present invention can therefore be calibrated for optimal intensity performance prior to the device 100 being operated in the image processing mode.

By way of further example, and not by way of limitation, LEDs 122, 124, and 126 can be exercised simultaneously or in rapid sequence and tested for particular characteristics of white light, such as, for example, white point setting. Resultant measures can be compared to previously detected or referenced values as stored in a light source controller 110 memory device (not shown) as either look-up tables or algorithmic expressions. If the combined LED outputs exhibit degraded performance, controller 110 can manipulate the input signal magnitudes for one, two, or all three of the LEDs in question until the desired white light characteristic is detected either by sensor 170 or controller 110 via empirical formula or algorithmic manipulation. As will be appreciated by those skilled in the art, LEDs 122, 124, 126 of the present invention can be calibrated for optimal white light characteristic performance prior to the device 100 being operated in the image processing mode.

By way of yet another example, and not by way of limitation, LEDs 122, 124, and 126 can be exercised in combinations, one with another, and tested for particular characteristics of color accuracy and color clarity. Resultant measures may again be compared to previously detected or referenced values as stored in a light source controller 110 memory device (not shown). If the combined LED outputs exhibit degraded performance, controller 110 can manipulate the input signal magnitudes for one or the other, or both of the LEDs in question until the desired color characteristic is detected by sensor 170 or controller 110 as previously discussed. As will be appreciated by those skilled in the art after review hereof, the present invention directly teaches and anticipates manipulating the input signal magnitude of light sources that exhibit degraded performance, as well as those that do not. Again, by way of example and not by way of limitation, consider the combination of red light from LED 124 when combined with Blue light from LED 126. As will be appreciated, equal parts of red and blue light when applied to combiner 130 should result in purple light. In accordance with the present invention, if one of the LEDs 124 and 126 is experiencing degraded performance, the resultant combination will not exhibit purple light of an expected quality, accuracy, clarity, or hue. Once detected by sensor 170, controller 110 will, in accordance with an embodiment of the present invention, adjust the electrical input to at least one of the two color light sources 124 and 126 in an attempt to rectify degraded color performance. As will be noted, several options are available to achieve this end. Controller 110 can increase the input signal magnitude (i.e., increase current flow) to the LED exhibiting degraded performance, or in the alternative, controller 110 may decrease the input signal magnitude (i.e., reduce current flow) to the LED that is not exhibiting degraded performance. While the later alternative may in fact reduce overall picture brightness and intensity, there are to be anticipated certain operating environments where power consumption concerns dictate the selection of a low power consumption solution. Battery operated and mobile image projection systems are but one example where this trade-off may arise.

Figure 2:
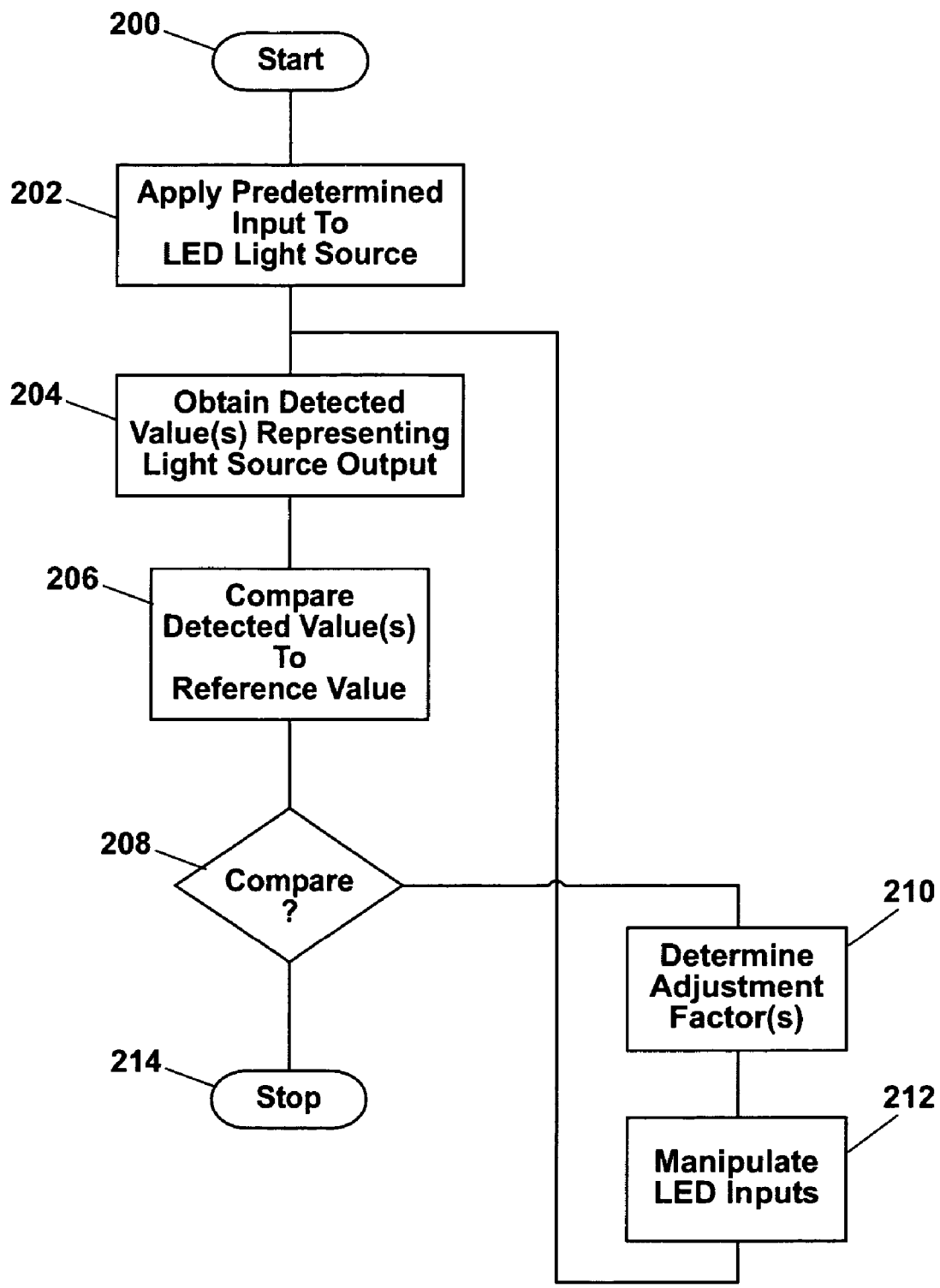
FIG. 2 shows a flow diagram of the steps performed by the image presentation device 100 of FIG. 1 in accordance with the present invention.

FIG. 2 shows a flow diagram of the steps performed by the image presentation device 100 of FIG. 1 in accordance with the present invention. Upon system power-up and initialization, or in conjunction with a non-image processing mode of operation, flow proceeds from block 200 to block 202, where under the direction and control of controller 105 of FIG. 1, the light source controller 110 applies a set of predetermined inputs to each of the three LEDs 122, 124, 126 comprising the device 100 light source. Such predetermined input values may be stored in a memory device look-up table as may be found within light source controller 110. As will be appreciated, LEDs 122, 124, 126, upon receipt of a set of predetermined electrical inputs, will respond by generating light output waveforms having measurable characteristics. During normal operation, these output waveforms exhibit characteristics that are generally predictable and repeatable. Over extended use; however, these characteristics may begin to degrade as the LEDs themselves age.

In an effort to counter these effects, flow proceeds from block 202 to block 204 where light being incident from LEDs 122, 124, 126 and through prism 140 is detected by sensor 170. In response, L/D converter 190 generates a digital control signal value representing the combined output from LEDs 122, 124, 126. From block 204, flow proceeds to block 206, where light source controller 110 derives a measure of detected light intensity from the digital signal value using known empirical formulas. Thereafter light source controller 110 compares the derived/detected value to a reference value as may be stored in memory. At block 208, if the detected and reference values compare within an acceptable range of tolerance, flow proceeds to block 214 where the process terminates. If, however, the comparison at block 208 falls outside an acceptable range, flow proceeds from block 208 to block 210, where the light source controller 110 determines a set of adjustment factors to be used to compensate for the condition detected at block 208.

By way of example, and not by way of limitation, assuming the comparison pursuant to blocks 206 and 208 identifies that one or more of the LEDs 122, 124, 126 is exhibiting degraded output performance, an appropriate response may be to increase the current flow to said degraded component in order to increase its light energy output response. In the alternative, however, it may be advantageous to decrease the current flow to one or more of the LEDs not exhibiting degraded performance in order to maintain overall system performance characteristics such as, for example the device's color space. In accordance with this alternative, it is anticipated that the device and method of operation disclosed herein may use the detection of a poorly operating LED as determined pursuant to steps 204-208, as the basis to adjust the electrical input another LED that is operating within an expected range of performance.

From block 210, flow proceeds to block 212 where the light source controller 110, manipulates, modifies, or adjusts the LED input values as a function of the adjustment factors derived at block 210. From block 212, flow branches back to block 204 where steps 204-208 are repeated until the comparison as performed at block 206 identifies that the image presentation device 100 is operating within acceptable tolerances. As such, it will be appreciated that the adjustment factor as determined at step 210 may be based upon a single detected value or upon a combination of values obtained from sensor 170 or L/D converter 190. In addition, it will be appreciated by those skilled in the art, after review hereof, that the present invention anticipates both increasing and decreasing input signal magnitude or current flow to the respective inputs for LEDs 122, 124, 126 as may be required to achieve optimal electrical, visual, or color space performance as may, from time to time, be defined for the image presentation device 100 of FIG. 1.

It is thus apparent that the present invention is not limited to the above embodiments but may be changed and modified by those skilled in the art without departing from the scope and spirit of the invention as described herein. For example, another low power consumption alternative is for controller 110 to provide a time domain pulsed input signal to LEDs 122, 124, and 126. By varying the pulse duration of the respective LED input signals, controller 110 can in effect manipulate the current flow into and conversely the light output by LEDs 122, 124, and 126 to achieve the very purpose of the present invention as set forth herein.

What is claimed is:

1. A method of operating an image presentation device, comprising the steps of:
    (a) selecting a plurality of different color light sources, and for each light source selected:
        applying a predetermined input to the light source to output light such that each different color light source is sequentially actuated;
        obtaining a value from a sensor representing an output from each selected light source;
    (b) algorithmically determining an adjustment factor for the plurality of different color light sources based on one or more of the values obtained from the sensor such that a combination of the plurality of different color light sources results in a predetermined calibrated color temperature; and
    (c) applying a time domain pulse input signal to the plurality of different color light sources and varying pulse duration of each input signal as a function of the adjustment factor.

2. The method of claim 1, wherein the plurality of different color light sources comprise red, green, and blue light emitting diodes.

3. A method of operating an image presentation device, comprising the steps of:

selecting three different color light sources, and for each light source selected:
  applying a predetermined input to the light source to output light such that each of the three different color light sources are sequentially actuated; and
  obtaining a value from a sensor representing an output from each light source;
determining an adjustment factor for each of the three different color light sources based on a combination of the values obtained from the sensor, such that a combination of the three different light sources results in a predetermined calibrated white point characteristic; and
applying a time domain pulse input signal to the three different color light sources and varying pulse duration of each input signal using at least in part the adjustment factors to maintain the predetermined calibrated white point characteristic when light from the three different color light sources is combined.

4. The method of claim 3, wherein the three different color light sources are one of red, green, and blue light emitting diodes.

5. The method of claim 3, further comprising the step of performing the steps of selecting, determining, and applying during a startup mode of the image presentation device.

6. A method of operating an image presentation device, comprising the steps of:
  applying a predetermined electrical input to a particular light source selected from a plurality of differing color light sources such that each differing color light source is sequentially actuated, wherein the plurality of differing color light sources comprise red, green, and blue light emitting diodes;
  obtaining a particular value from a sensor representing an output from each particular light source;
  determining separate adjustment factors for at least two of the plurality of differing color light sources based on the particular value obtained from the sensor; and
  applying a time domain pulse input signal to the plurality of differing color light sources and varying pulse duration of the input signal for at least two differing color light sources using at least in part, the separate adjustment factors determined, such that a combination of the three light sources results in maintenance of a predetermined color temperature.

7. An image presentation device having a light source with correction system comprising:
  a plurality of different color light sources, each light source having an input and actuated to produce light in a sequential manner;
  a light sensor positioned to receive light originating from the plurality of different color light sources; and
  a controller coupled to the plurality of color light sources and to the sensor and operable to apply a time domain pulse input signal to the plurality of color light sources, the controller being responsive to output from the sensor to vary pulse duration of the input signal for at least one of the plurality of differing color light sources in order to maintain a particular white color temperature when light from the plurality of differing color sources is combined.

8. The image presentation device of claim 7, wherein the plurality of differing color light sources are light emitting diodes.

9. The image presentation device of claim 7, wherein the sensor is selected from a group consisting of: light intensity detectors, photoelectric conversion devices, and pin diodes.

10. A video projection device comprising:
  a plurality of light emitting diodes (LEDs) comprising red, green, and blue LEDs that are sequentially actuated in a substantially rapid manner;
  a sensor positioned to receive light from at least one of the plurality of LEDs;
  a memory device having an algorithm for determining input to the plurality of LEDs to maintain a particular color temperature when light from the plurality of LEDs is combined; and
  a controller, coupled to the plurality of LEDs and to the sensor and operable to apply a time domain pulse input signal to the plurality of LEDs, the controller being responsive to sensor output and the algorithm, to individually vary pulse duration of the input to each of the plurality of LEDs, such that the particular color temperature is maintained when light from the plurality of LEDs is combined.

* * * * *

UNITED STATES PATENT AND TRADEMARK OFFICE
CERTIFICATE OF CORRECTION

| | | |
|---|---|---|
| PATENT NO. | : 7,377,657 B2 | Page 1 of 1 |
| APPLICATION NO. | : 11/142132 | |
| DATED | : May 27, 2008 | |
| INVENTOR(S) | : Israel J. Morejon et al. | |

It is certified that error appears in the above-identified patent and that said Letters Patent is hereby corrected as shown below:

On the title page, item [75] Inventors: "Chandrika Sugrim" should read
--Chandraika Sugrim--

Signed and Sealed this

Eighth Day of June, 2010

David J. Kappos
*Director of the United States Patent and Trademark Office*